(12) United States Patent
Shao et al.

(10) Patent No.: US 11,860,610 B2
(45) Date of Patent: *Jan. 2, 2024

(54) SYSTEMS OF INDUSTRIAL INTERNET OF THINGS FOR INDUSTRIAL PRODUCTION CONTROL AND CONTROL METHODS THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Bin Liu, Chengdu (CN); Haitang Xiang, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,297

(22) Filed: Dec. 15, 2022

(65) Prior Publication Data

US 2023/0115799 A1 Apr. 13, 2023

Related U.S. Application Data

(63) Continuation of application No. 17/807,717, filed on Jun. 18, 2022, now Pat. No. 11,586,183.

(30) Foreign Application Priority Data

Apr. 11, 2022 (CN) .......................... 202210370869.X

(51) Int. Cl.
*G05B 19/418* (2006.01)
(52) U.S. Cl.
CPC ..... *G05B 19/4185* (2013.01); *G05B 19/4183* (2013.01); *G05B 19/41865* (2013.01)

(58) Field of Classification Search
USPC ........................................................ 700/19
See application file for complete search history.

(56) References Cited

U.S. PATENT DOCUMENTS

| 10,575,072 B1 | 2/2020 | Shao |
| 11,086,298 B2 | 8/2021 | Chand et al. |

(Continued)

FOREIGN PATENT DOCUMENTS

| CN | 103973723 | 8/2014 |
| CN | 106444659 A | 2/2017 |

(Continued)

OTHER PUBLICATIONS

Shao, Zehua, Exploration and Research on the Structure of Internet of Things, Internet of Things Technologies Reliable Transmission, 2015, 10 pages.

(Continued)

*Primary Examiner* — Hien D Khuu
(74) *Attorney, Agent, or Firm* — METIS IP LLC

(57) ABSTRACT

The present disclosure discloses a system of an industrial internet of things for industrial production control and a method. The system of industrial internet of things includes a user platform, a service platform, a management platform, a sensor network platform, and an object platform that interact in turn. The service platform adopts a centralized layout, and the management platform and the sensor network platform adopt a front sub platform layout. The user platform generates product manufacturing parameters of a production line, and transmits them in a form of instructions through the service platform, the management platform, and the sensor network platform. The sensor network platform finally integrates the received instructions with the real-time manufacturing data of the product to form different types of configuration files, and transmits them to the object plat- (Continued)

form, so that the object platform can perform production control processing based on the received data.

20 Claims, 5 Drawing Sheets

(56) References Cited

U.S. PATENT DOCUMENTS

| | | |
|---|---|---|
| 11,435,726 B2 | 9/2022 | Sayyarrodsari et al. |
| 11,586,183 B1 * | 2/2023 | Shao .................. G05B 19/4183 |
| 2009/0204237 A1 | 8/2009 | Sustaeta et al. |
| 2009/0210081 A1 | 8/2009 | Sustaeta et al. |
| 2014/0310036 A1 | 10/2014 | Grosso |
| 2022/0019204 A1 | 1/2022 | Maury et al. |

FOREIGN PATENT DOCUMENTS

| | | | | |
|---|---|---|---|---|
| CN | 106527384 A | * | 3/2017 | ........... G05B 19/418 |
| CN | 106779316 A | | 5/2017 | |
| CN | 107210607 A | | 9/2017 | |
| CN | 107613001 A | | 1/2018 | |
| CN | 107707386 A | * | 2/2018 | ............. G06Q 50/06 |
| CN | 107707386 A | | 2/2018 | |
| CN | 107809457 A | | 3/2018 | |
| CN | 107862485 A | | 3/2018 | |
| CN | 110224853 | | 9/2019 | |
| CN | 111507563 A | | 8/2020 | |
| CN | 112180851 A | | 1/2021 | |
| CN | 112859792 A | | 5/2021 | |

OTHER PUBLICATIONS

Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.
First Office Action in Chinese Application No. 202210370869.X dated May 11, 2022, 15 pages.
Decision to Grant a Patent for Invention in Chinese Application No. 202210370869.X dated May 17, 2022, 3 pages.

* cited by examiner

300

- 310: The plurality of sub platforms of the management platform being configured as a stamping management platform, a welding management platform, a coating management platform, and a general assembly management platform based on a stamping process, a welding process, a coating process, and a general assembly process in an automobile production process

- 320: Respectively predicting material loss of a single vehicle, a production capacity per unit time, and a safety stock of each material in each automobile production process by the plurality of sub platforms of the management platform

- 330: Determining a production plan and a purchase plan by taking the material loss of a single vehicle, the production capacity per unit time, and the safety stock of each material in each automobile production process as basic data of a material demand planning system

- 340: Generating the third instruction recognized by the sensor network platform based on the production plan and the purchase plan

- 350: Sending material purchase reminders by a plurality of sub-platforms of management platform according to the relationship between actual inventory and safety inventory in the future

- 360: Generating a third instruction recognized by sensor network platform based on the material purchase reminder

FIG. 3

SYSTEMS OF INDUSTRIAL INTERNET OF THINGS FOR INDUSTRIAL PRODUCTION CONTROL AND CONTROL METHODS THEREOF

CROSS-REFERENCE TO RELATED APPLICATION

This application is a continuation of U.S. application Ser. No. 17/807,717, filed on Jun. 18, 2022, which claims priority of Chinese Patent Application No. 202210370869.X, filed on Apr. 11, 2022, the entire contents of which are hereby incorporated by reference.

TECHNICAL FIELD

The present disclosure relates to intelligent manufacturing technology, in particular to a system of an industrial internet of things for industrial production control and control methods thereof.

BACKGROUND

In the field of product intelligent manufacturing, the intelligent product production line involves a plurality of intelligent manufacturing equipment. A plurality of intelligent manufacturing equipment are set according to a relationship of upstream and downstream, and the parts, components, or products to be manufactured are assembled in turn to form products. In the prior art, the upstream and downstream intelligent manufacturing equipment needs to comprehensively consider the unit product manufacturing capacity of each intelligent manufacturing equipment. For example, when the unit time manufacturing capacity of the upstream equipment is five, the unit time manufacturing capacity of the downstream equipment is better to be greater than or equal to five, so as to prevent the workpiece manufactured by the upstream equipment from accumulating to the downstream equipment and may not be digested in time. If the unit time manufacturing capacity of the downstream equipment is less than five, it may cause the upstream equipment to suspend operation (generally, it may not be shut down, due to shutting down and restarting, some equipment consumes high energy and takes a long time, which also needs preheating, pre-regulation, etc., causing that cost is high and working hours are long). It may not be operated again until the downstream equipment completes the production of accumulated workpieces, resulting in a large amount of no-load time for the upstream equipment. When the upstream equipment stops operation, the upstream equipment also makes corresponding adjustments, resulting in the adjustment of product manufacturing capacity in the whole production line, which affects the progress and orderly cooperation of the whole process.

In practical application, when the specified production capacity of the product may not be completed within the specified time, it is generally necessary to increase the manufacturing capacity of workpieces in each link. Therefore, it requires to consider how to adjust the overall production capacity of the equipment in each link without exceeding a maximum production capacity of the equipment in each link. The processes of processing and manufacturing of accessories, parts, components, and other structures required by the product are more and more complex, which involves the overall coordination of different workshops, different processes, and different equipment, the amount of data involved is huge and data types is more, the existing internet of things can not meet such a complex and cumbersome application environment and data processing. As a result, in the prior art, the assembly line may only be processed and divided into several small sub areas according to workshops, processes, or different parts for separately controlling, which cannot achieve overall coordination, and the manager cannot regulate and manage the output of all production equipment of the product as a whole.

SUMMARY

One aspect of some embodiments of the present disclosure provides a system of an industrial internet of things for industrial production control. The system comprises a user platform, a service platform, a management platform, a sensor network platform, and an object platform that interact in turn. The service platform adopts a centralized layout, the management platform and the sensor network platform adopt a front sub platform layout. The centralized layout refers to that the service platform uniformly receives data, uniformly processes the data, and uniformly sends the data. The front sub platform layout refers to that each of the management platform and the sensor network platform is provided with a general platform and a plurality of sub platforms, the plurality of sub platforms respectively store and process data of different types or different receiving objects sent by a lower platform, and the general platform stores, processes, and transmits the data to a upper platform after summarizing the data of the plurality of sub platforms. The user platform receives, from a user, a modification instruction of product manufacturing parameters according to production needs, to modify the product manufacturing parameter of a production line, generates a first instruction and sends the first instruction to the service platform, and the product manufacturing parameters include a product manufacturing capacity. The service platform receives and processes the first instruction to generate a second instruction recognized by the management platform, and sends the second instruction to the general platform of the management platform. The general platform of the management platform receives the second instruction and sends the second instruction to the plurality of sub platforms of the management platform at the same time. The plurality of sub platforms of the management platform perform data processing on the second instruction to generate a third instruction recognized by the sensor network platform, and the third instruction is transmitted to the general platform of the sensor network platform through the plurality of sub platforms of the management platform, respectively. The general platform of the sensor network platform receives the third instruction and sends the third instruction to the plurality of sub platforms of the sensor network platform at the same time. The plurality of sub platforms of the sensor network platform integrate the third instruction with data of real-time product manufacturing capacity to form different types of configuration files, and send the configuration files to corresponding object platform, and the plurality of sub platforms of the sensor network platform are provided with independent sub platform databases, and the data of real-time product manufacturing capacity is real-time data stored in corresponding sub platform databases corresponding to the object platform, which is obtained by a product meter. The object platform receives the configuration files sent by the corresponding sub platforms of the sensor network platform, performs manufacturing, or sends purchase reminders according to the configuration files.

One aspect of some embodiments of the present disclosure provides a method for industrial production control based on an industrial internet of things. The industrial internet of things includes a user platform, a service platform, a management platform, a sensor network platform, and an object platform that interact in turn. The service platform adopts a centralized layout. The management platform and the sensor network platform adopt a front sub platform layout. The centralized layout refers to that the service platform uniformly receives data, uniformly processes the data, and uniformly sends the data. The front sub platform layout refers to that each management platform and the sensor network platform is provided with a general platform and a plurality of sub platforms, the plurality of sub platforms respectively store and process data of different types or different receiving objects sent by a lower platform, and the general platform stores, processes, and transmits the data to an upper platform after summarizing the data of the plurality of sub platforms. The method comprises: sending, by a user, a modification instruction of product manufacturing parameters according to production needs; receiving, by the user platform, the modification instruction to modify the product manufacturing parameter of a production line, generating a first instruction and sending the first instruction to the service platform, the product manufacturing parameters including a product manufacturing capacity; receiving and processing, by the service platform, the first instruction to generate a second instruction recognized by the management platform, and sending the second instruction to the general platform of the management platform; receiving, by the general platform of the management platform, the second instruction and sending the second instruction to the plurality of sub platforms of the management platform at the same time; performing, by the plurality of sub platforms of the management platform, data processing on the second instruction to generate a third instruction recognized by the sensor network platform, and transmitting the third instruction to the general platform of the sensor network platform through the plurality of sub platforms of the management platform, respectively; receiving, by the general platform of the sensor network platform, the third instruction, and sending the third instruction to the plurality of sub platforms of the sensor network platform at the same time; integrating, by the plurality of sub platforms of the sensor network platform, the third instruction with data of real-time product manufacturing capacity to form different types of configuration files, and sending the configuration files to corresponding object platform, the plurality of sub platforms of the sensor network platform being provided with independent sub platform databases, and the data of real-time product manufacturing capacity is real-time data stored in corresponding sub platform databases corresponding to the object platform, which is obtained by a product meter; and receiving, by the object platform, the configuration files sent by the corresponding sub platforms of the sensor network platform, and performing manufacturing, or sending purchase reminders according to the configuration files.

Compared with the prior art, the beneficial effects of the present disclosure are as follows: in order to coordinate the product manufacturing capacity of all production line equipment to ensure that all production line equipment can reasonably increase or reduce production, the sensor network platform and management platform adopts the front sub platform layout, the upper and lower data are uniformly sorted and sent through the general platform, and the different sub platforms are used as channels of the data processing or the data transmission of different production line equipment, so as to store and process a large amount of data by classification, reduce the overall data processing capacity and calculation pressure of the platform. The data is processed by the sensor network platform to form different configuration files, so as to realize the data classification and recognition of all production line equipment. The data of modifiable product manufacturing capacity as data is uploaded to further reduce the data transmission capacity on the premise of ensuring the reasonable adjustment of all production line equipment, so as to realize safe and fast product manufacturing control and data sending and receiving.

BRIEF DESCRIPTION OF THE DRAWINGS

The drawings described herein are used to provide a further understanding of the embodiments of the present disclosure, which form a part of the present application, and do not constitute a limitation of the embodiments of the present disclosure, wherein:

FIG. 3 is an exemplary flowchart of a plurality of sub platforms of the management platform performing data processing on the second instruction to generate a third instruction recognized by the sensor network platform according to some embodiments of the present disclosure;

DETAILED DESCRIPTION

In order to make the purpose, technical scheme, and advantages of the present disclosure more clear, the present disclosure is further described in detail below in combination with the embodiments and drawings. The schematic embodiments and descriptions of the present disclosure are only used to explain the present disclosure and are not used as a limitation of the present disclosure.

As used herein, the singular forms "a," "an," and "the" may be intended to include the plural forms as well, unless the context clearly indicates otherwise; and the plural forms may be intended to include the singular forms as well, unless the context clearly indicates otherwise.

Figure 1:
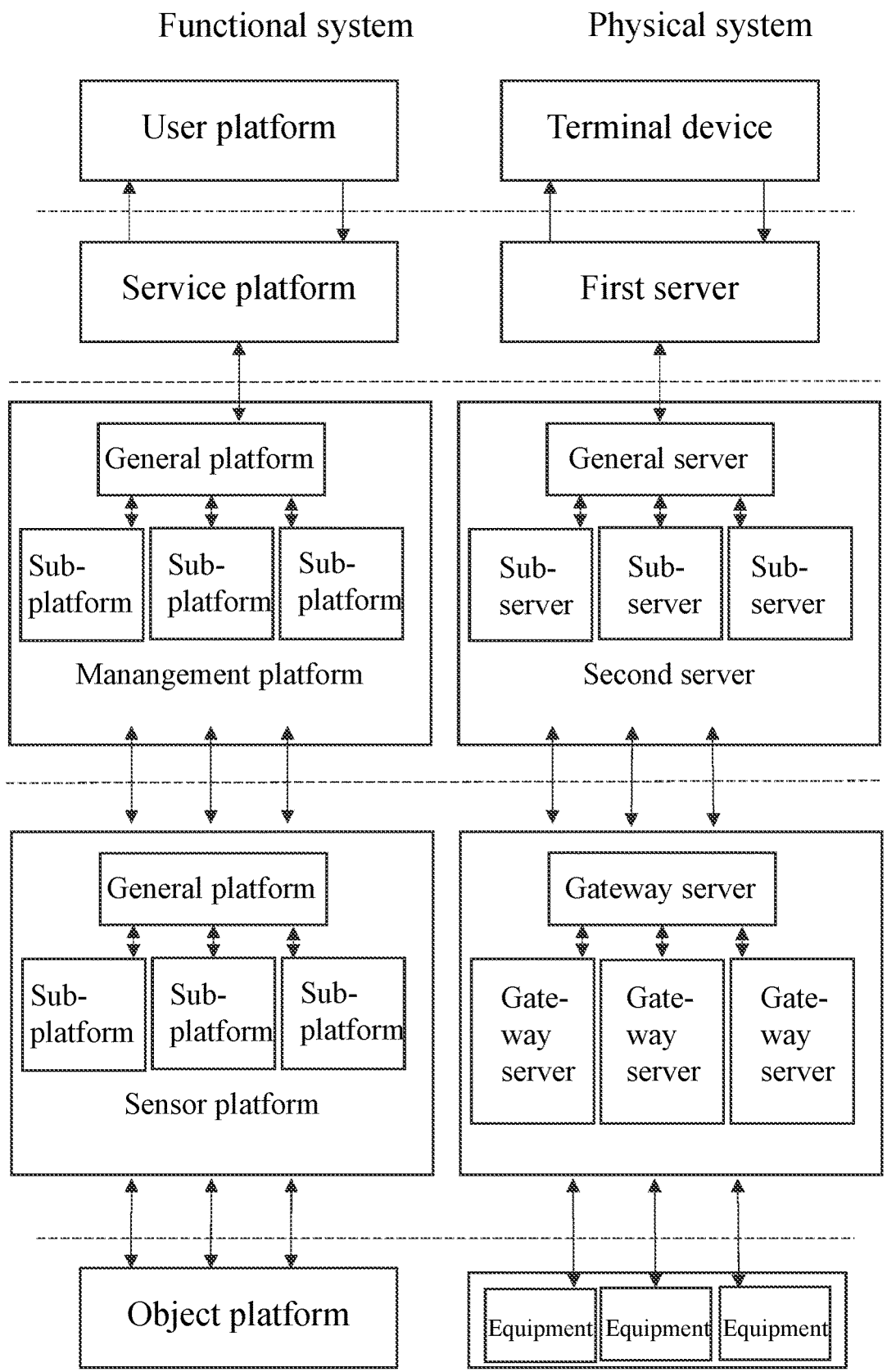
FIG. 1 is a structural frame diagram of an industrial internet of things with dual front sub platform according to some embodiments of the present disclosure.

As shown in FIG. 1, some embodiments of the present disclosure aim to provide an industrial internet of things with dual front sub platform, the industrial internet of things includes a user platform, a service platform, a management platform, a sensor network platform and an object platform that interact in turn. The service platform adopts a centralized layout, and the management platform and the sensor network platform adopt a front sub platform layout. The centralized layout refers to that the service platform uniformly receives data, uniformly processes the data, and uniformly sends the data. The front sub platform layout refers to that each management platform and the sensor network platform is provided with a general platform and a plurality of sub platforms, the plurality of sub platforms respectively store and process data of different types or different receiving objects sent by a lower platform, and the general platform stores, processes, and transmits the data to a upper platform after summarizing the data of the plurality of sub platforms. A user sends a modification instruction of product manufacturing parameters according to production needs. The user platform receives the modification instruction to modify the product manufacturing parameter of a production line, generates a first instruction and sends the first instruction to the service platform. The product manufacturing parameters include a product manufacturing capacity. The service platform receives and processes the first instruction to generate a second instruction recognized by the management platform and sends the second instruction to the general platform of the management platform. The general platform of the management platform receives the second instruction and sends the second instruction to a plurality of sub platforms of the management platform at the same time. The plurality of sub platforms of the management platform perform data processing on the second instruction to generate a third instruction recognized by the sensor network platform, and the third instruction is transmitted to the general platform of the sensor network platform through the sub platforms of the management platform, respectively. The general platform of the sensor network platform receives the third instruction and sends the third instruction to a plurality of sub platforms of the sensor network platform at the same time. The plurality of sub platforms of the sensor network platform integrate the third instruction with data of real-time product manufacturing capacity to form different types of configuration files, and send the configuration files to corresponding object platform. The sub platforms of the sensor network platform are provided with independent sub platform databases, and the data of real-time product manufacturing capacity is real-time data stored in corresponding sub platform databases corresponding to the object platform, which is obtained by a product meter. The object platform receives the configuration files sent by the sub platforms of corresponding sensor network platform, performs manufacturing, or sends purchase reminders according to the configuration files.

It should be noted that as the physical architecture of the industrial internet of things with dual front sub platform, it is specifically as follows: the user platform is configured as a terminal device, which interacts with the user. The service platform is configured as a first server, which receives an instruction from the user platform and sends it to the management platform, extracts information required for processing the user platform from the management platform and sending it to the user platform. The management platform is configured as a second server, which controls the operation of the object platform and receives the feedback data of the object platform. The sensor network platform is configured as a communication network and a gateway for interaction between the object platform and the management platform. The object platform is configured as a production line equipment to perform manufacturing and/or sends purchase reminders, and a product meter. Since this part belongs to a more common architecture in the prior art, descriptions of the embodiment are not repeated.

In the prior art, in the field of intelligent manufacturing technology, the production process of products and their accessories involves more production line equipment, each production line equipment has a maximum product manufacturing capacity per unit time, each production line equipment may operate according to an actual product manufacturing capacity, in which the actual product manufacturing capacity is less than or equal to the maximum product manufacturing capacity. When it is necessary to adjust the manufacturing capacity of a production line equipment or all production line equipment, it is necessary to consider that each production line equipment may not exceed its maximum product manufacturing capacity after adjustment. After the adjustment of a single production line equipment, it is also necessary to consider its impact on other production line equipment on the production line. Due to the large count of production line equipment, the data integration and classification in the existing technology are not only large in processing capacity, but also irregular in classification, which is very difficult to implement, resulting in the inability to realize the unified regulation of the whole production line equipment in the existing technology. It often requires a plurality of systems of internet of things classified separately, which undoubtedly increases the cost and system complexity.

The industrial internet of things with dual front sub platform in the embodiment first uses the independently arranged service platform to process all instructions and uploaded data, so as to facilitate data integration and data manipulation, and facilitate the coordinated and unified processing of the user platform, so that the service platform and/or user platform can better control the internet of things. While the management platform adopts the front sub platform layout, it may use its general platform and service platform for data interaction and use its different sub platforms for data transmission and processing, so as to fully share the overall data processing capacity of the management platform and ensure that the data transmission of different sub platforms may correspond to different object platforms. Similarly, the sensor network platform adopts the front sub platform layout, the general platform of the sensor network platform may be used to integrate and upload data or distribute and decompose the data to the corresponding sub platform according to different objects, and the sub platform may be used to process the collected data or received data, so as to unify the data format of different object platforms and keep consistent with the data of the management platform, realize the integration of different data sources of different object platforms, simplify the data interaction format conversion of different object platforms, and reduce data processing.

It should be noted that the user platform in the embodiment may be a desktop computer, a tablet computer, a notebook computer, a mobile phone, or other electronic devices that can realize data processing and data communication, which is not limited here. In specific applications, the first server and the second server may adopt a single server or a server cluster, which is not too limited here. It should be understood that a process of the data processing mentioned in the embodiment may be processed by the processor of the server, and the data stored in the server may be stored on the storage device of the server, such as a hard disk and other memory. In specific applications, the sensor network platform may adopt a plurality of groups of gateway servers or a plurality of groups of intelligent routers, which are not limited here. It should be understood that the process of the data processing mentioned in the embodiment of the present disclosure may be processed by the processor of the gateway server, and the data stored in the gateway server may be stored in the storage device of the gateway server, such as the hard disk and other memories such as a solid state drive (SSD).

In some embodiments, the production line equipment is all kinds of production line equipment relied on in the assembly line of product manufacturing. Taking mechanical products as an example, the production line equipment may be part assembly equipment, general assembly equipment, testing equipment, etc. Further, taking the automobile engine assembly line as an example, the production line equipment may be cylinder block processing equipment, cylinder block positioning and turnover equipment, cam assembly installation equipment, bolt assembly installation equipment, machine filter assembly, and oiling equipment, etc. Similarly, the product meter is used to measure the completion of workpieces within the unit time in the corresponding production line equipment, which may be various mechanical or electronic counters.

In some embodiments, modifiable data set of the product manufacturing capacity is modifiable data set of the final product manufacturing capacity, which is modification data of the manufacturing capacity obtained by comprehensively considering all production line equipment without affecting the normal manufacturing of all production line equipment. Specifically, the sub platforms of a plurality of the sensor network platforms correspond to different production line equipment, and each production line equipment is correspondingly configured with the product meter. The production line equipment stores and classifies data of maximum product manufacturing capacity per unit time of equipment and the data of real-time product manufacturing capacity obtained in real time by the product meter to the sub platforms of corresponding sensor network platform. The sub platforms of the sensor network platform obtain data of modifiable product manufacturing capacity of corresponding production line equipment based on the data of maximum product manufacturing capacity and the data of real-time product manufacturing capacity, and transmit the data of modifiable product manufacturing capacity to the general platform of the sensor network platform through the corresponding sub platforms. The data of modifiable product manufacturing capacity is a difference between the data of maximum product manufacturing capacity and the data of real-time product manufacturing capacity. The general platform of the sensor network platform compiles and packages all the data of modifiable product manufacturing capacity and sends it to the corresponding sub platforms of the management platform. The general platform of the management platform receives and analyzes the data of modifiable product manufacturing capacity of each sub platform of the management platform, compares the data of modifiable product manufacturing capacity of all production line equipment, obtains a minimum value of the data of modifiable product manufacturing capacity as a final value of modifiable product manufacturing capacity, and compiles and transmits the final value of modifiable product manufacturing capacity to the service platform. The service platform receives and analyzes the final value of modifiable product manufacturing capacity, decomposes the value of modifiable product manufacturing capacity obtained from the analysis according to operation rules to form different sub data sets or arrays, maps the sub data sets or the arrays to a data table of modifiable product manufacturing capacity to form a data set of modifiable product manufacturing capacity, and compiles and sends the data set to the user platform. The data table of modifiable product manufacturing capacity is a data table formulated in the service platform according to the operation rules for filling in sub data sets or the array.

In the embodiment, by obtaining a maximum data of the product manufacturing capacity and data of real-time product manufacturing capacity of the production line equipment in unit time respectively, the data of modifiable product manufacturing capacity of the corresponding production line equipment may be obtained, and then the modifiable product manufacturing capacity data of all production line equipment may be compared to determine the minimum data of modifiable product manufacturing capacity, different sub data sets or arrays may be formed within the range of product manufacturing capacity of this data, so as to select reasonable values for adjustment.

It is further illustrated that when installing cams in the automobile engine assembly line, it specifically includes eight sub processes: loosing tile cover 01, removing tile cover 02, installing upper and lower shaft tiles 03, installing piston cooling nozzle 04, inserting camshaft drive key 05, installing camshaft thrust plate 06, lifting and placing crankshaft 07, and driving key 08. It is assumed that a production line equipment is set for each process, which is numbered according to the order of 01-08, the specific parameters of each production line are shown in Table 1 below:

TABLE 1

| | Specific parameters of production line equipment | | | | | |
|---|---|---|---|---|---|---|
| Number | Maximum product manufacturing capacity | Real-time product manufacturing capacity | modifiable product manufacturing capacity | Minimum value of modifiable product manufacturing capacity | Sub data sets of modifiable product manufacturing capacity | Array of modifiable product manufacturing capacity |
| 01 | 32 | 24 | 8 | 7 | 0; 2; 4; 6 (allowable modifiable unit capacity is 2) | 0; 1; 2; 3; 4; 5; 6; 7 |
| 02 | 37 | 26 | 11 | | | |
| 03 | 43 | 35 | 8 | | | |
| 04 | 44 | 37 | 7 | | | |
| 05 | 55 | 42 | 13 | | | |
| 06 | 45 | 37 | 8 | | | |
| 07 | 36 | 29 | 7 | | | |
| 08 | 55 | 44 | 11 | | | |

It can be seen from table 1 that after comparing the minimum values among the eight production line equipment in 01-08, the minimum modifiable product manufacturing capacity in all production line equipment is 7, so 7 is taken as the final modifiable product manufacturing capacity. When the manufacturing capacity of all production line equipment in 01-08 is increased, it may not exceed the maximum product manufacturing capacity of all production line equipment, so as to ensure safety regulation. The data is only used as processing source of the subsequent data, which can also reduce the huge data processing capacity brought by a plurality of parameters of different production line equipment.

In some embodiments, the value of modifiable product manufacturing capacity obtained from the analysis is decomposed according to the operation rules to form different sub data sets or arrays. The operation rules are as follows: taking natural number less than or equal to the value of modifiable product manufacturing capacity as the modifiable values, and forming a sequentially sorted array of all modifiable values; or presetting an allowable modifiable unit capacity by the service platform, multiplying the allowable modifiable unit capacity with the natural number starting from zero, and taking all the values whose calculation results are less than the value of modifiable product manufacturing capacity as a sub data set, and the allowable modifiable unit capacity being a minimum value of modified product manufacturing capacity that is allowed for each production line equipment.

Taking Table 1 as an example, when the modifiable product manufacturing capacity is 7, the natural number less than or equal to 7 includes 0, 1, 2, 3, 4, 5, 6, and 7. Thus, the above values are taken as modifiable values to form an array, and the user platform may select within a range of the array. Similarly, when the modifiable product manufacturing capacity is 7 and the allowable modifiable unit capacity is set to be 2, a data set including 0, 2, 4, and 6 may be formed, and the user platform may select an increased product manufacturing capacity in the data set.

In some embodiments, after modifying all production line equipment to complete the current product manufacturing task, when it is necessary to restore the starting manufacturing capacity, it may be restored by the following methods: the sub platforms of the sensor network platform take the data of real-time product manufacturing capacity as the basic data before manufacturing is not performed by the production line equipment according to the configuration files; after the object platform performs manufacturing according to the configuration file and the user platform sends a data rollback instruction, the service platform performs the data processing on the data rollback instruction and sends it to the general platform of the management platform. The general platform of the management platform sends the data rollback instruction to a plurality of sub platforms of the management platform at the same time, the plurality of sub platforms of the management platform perform the data processing on the data rollback instruction to generate a recognizable data recognizable by the sensor network platform and send the recognizable data to the general platform of the sensor network platform. The general platform of the sensor network platform receives the data rollback instruction and respectively sends the processed data rollback instruction to each sub platform of the sensor network platform after performing the data processing on the data rollback instruction. The sub platforms of the sensor network platform receive the data rollback instruction, perform rollback operation with the basic data in each sub platform as rollback data, send the basic data to the production line equipment and update and cover the parameter value of existing product manufacturing capacity.

In some embodiments, the plurality of sub platforms of the sensor network platform integrate the third instruction with the data of real-time product manufacturing capacity to form different types of configuration files, and send the configuration files to the corresponding object platform including: extracting modification instruction data of the product manufacturing capacity from the third instruction, and obtaining parameter values of real-time product manufacturing capacity through adding modification value of the product manufacturing capacity in the modification instruction data to the data of real-time product manufacturing capacity by the plurality of sub platforms of the sensor network platform; forming different types of the configuration files using the operation rules of different production line equipment for the parameter values of real-time product manufacturing capacity, and sending the configuration files to the corresponding object platform. Through the above operations, a plurality of sub platforms of the sensor network platform may convert the third instruction into the parameter value of real-time product manufacturing capacity, so that the production line equipment may directly read and use the configuration file, further simplifying the difficulty of data interaction of production line equipment.

In some embodiments, the object platform receives the configuration file sent by the sub platform of the corresponding sensor network platform and performs manufacturing according to the configuration file including: receiving the configuration files as update files sent by the sub platforms of corresponding sensor network platform by the production line equipment of the object platform, and updating and iterating the parameter value of existing product manufacturing capacity of production line equipment using the parameter value of real-time product manufacturing capacity in the configuration file by the production line equipment of the object platform, and the production line equipment controls the product manufacturing capacity in unit time.

In some embodiments, the count of workpieces manufactured by different production line equipment per unit time is different, in order to minimize the impact of modified manufacturing capacity on all production line equipment, it is best to modify the manufacturing capacity of production line equipment with small manufacturing capacity first. Therefore, it is necessary for different production line equipment to modify the manufacturing capacity according to different execution times, which may be executed by the following method. When the first instruction corresponds to different execution time, the sub platforms of the management platform write the execution time into the corresponding third instruction. When the sub platform databases of the sensor network platform receive and store the third instruction, the sub platforms of the sensor network platform extract the execution time using processors of the sub platforms. When the third instruction is integrated with the data of real-time product manufacturing capacity to form the configuration files, the execution time is written into the configuration files. After the object platform receives the configuration files sent by the sub platforms of the corresponding sensor network platform, the object platform extracts the execution time and performs manufacturing according to the configuration files at the execution time. The processors of sub platforms are respectively arranged in corresponding gateways of the sub platforms of the sensor network platform.

Figure 2:
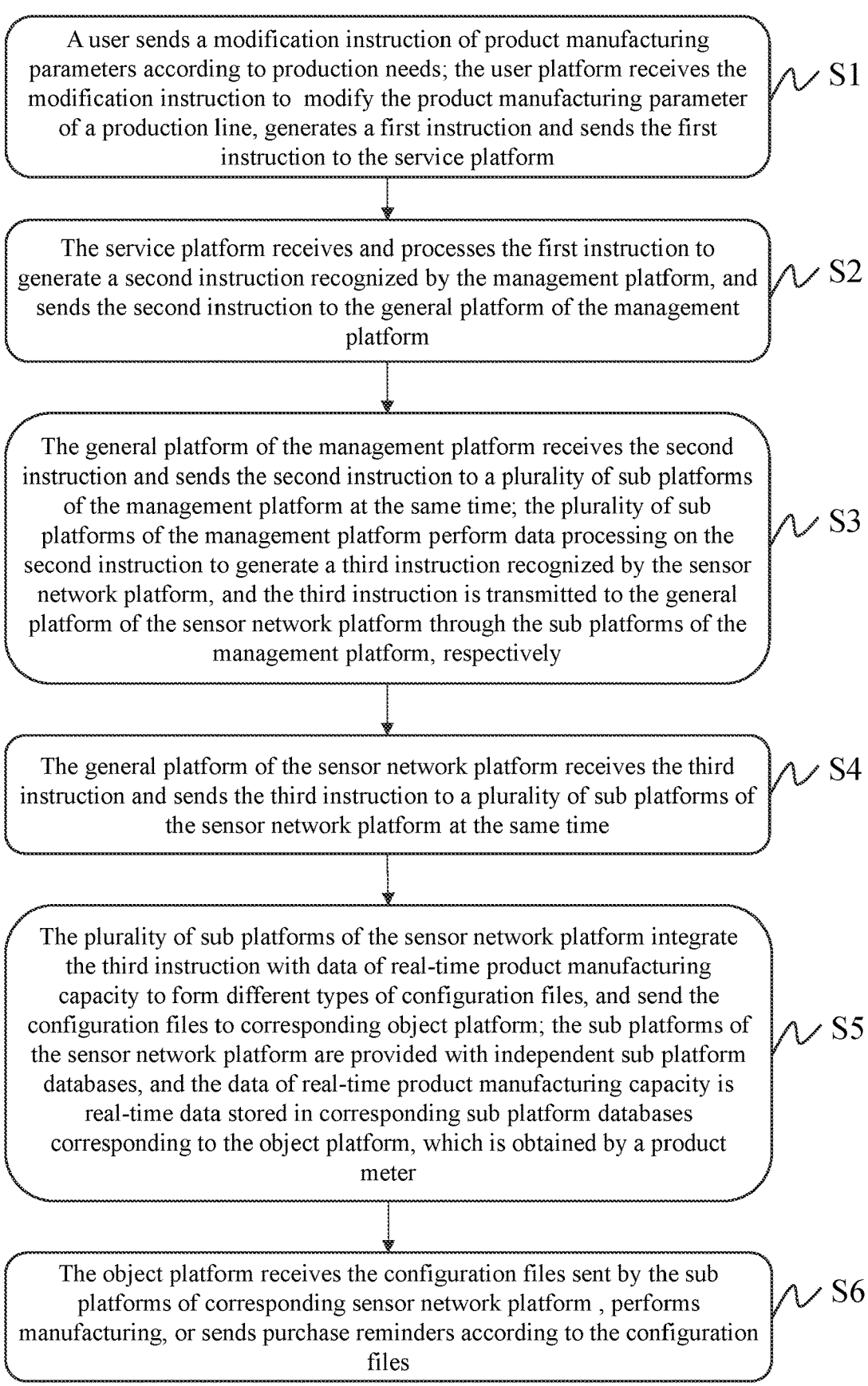
FIG. 2 is a flowchart of a control method for the industrial internet of things with dual front sub platform according to some embodiments of the present disclosure.

As shown in FIG. 2, some embodiments of the present disclosure aim to provide a control method for the industrial internet of things with dual front sub platform, the industrial internet of things includes a user platform, a service platform, a management platform, a sensor network platform and an object platform that interact in turn. The service platform adopts a centralized layout, and the management platform and the sensor network platform adopt a front sub platform layout. The centralized layout refers to that the service platform uniformly receives data, uniformly processes the data, and uniformly sends the data. The front sub platform layout refers to that each management platform and the sensor network platform is provided with a general platform and a plurality of sub platforms, the plurality of sub platforms respectively store and process data of different types or different receiving objects sent by a lower platform, and the general platform stores, processes, and transmits the data to a upper platform after summarizing the data of the plurality of sub platforms. A user sends a modification instruction of product manufacturing parameters according to production needs. The user platform receives the modification instruction to modify the product manufacturing parameter of a production line, generates a first instruction and sends the first instruction to the service platform. The product manufacturing parameters include a product manufacturing capacity. The service platform receives and processes the first instruction to generate a second instruction recognized by the management platform and sends the second instruction to the general platform of the management platform. The general platform of the management platform receives the second instruction and sends the second instruction to a plurality of sub platforms of the management platform at the same time. The plurality of sub platforms of the management platform perform data processing on the second instruction to generate a third instruction recognized by the sensor network platform, and the third instruction is transmitted to the general platform of the sensor network platform through the sub platforms of the management platform, respectively. The general platform of the sensor network platform receives the third instruction and sends the third instruction to a plurality of sub platforms of the sensor network platform at the same time. The plurality of sub platforms of the sensor network platform integrate the third instruction with data of real-time product manufacturing capacity to form different types of configuration files, and send the configuration files to corresponding object platform. The sub platforms of the sensor network platform are provided with independent sub platform databases, and the data of real-time product manufacturing capacity is real-time data stored in corresponding sub platform databases corresponding to the object platform, which is obtained by a product meter. The object platform receives the configuration files sent by the sub platforms of corresponding sensor network platform, performs manufacturing, or sends out purchase reminders according to the configuration files.

The following describes the industrial internet of things with dual front sub platform and its control method by taking the example that the automobile production process determines the product manufacturing parameters of the production line through a material requirement planning system.

Automobile production process may include stamping process, welding process, coating process and general assembly process.

Material requirement planning (MRP) refers to that a backward plan is made according to the length of the lead time the subordination and capacity relationship of items at all levels according to the product structure, by taking each item as the planning object and taking the completion period as the time benchmark, and the order of release time of each item is distinguished according to the length of the lead time, which is a material planning management mode in industrial manufacturing enterprises. The material requirement planning system is a management information system based on logistics demand planning. Production plan and purchase plan may be determined by inputting the basic data into the MRP system.

Production plan refers to the plan that the enterprise makes overall layouts for production tasks and specifically formulates the variety, quantity, quality and progress of production products. Purchase plan refers to the predictable layout and deployment of material purchase management activities during the planning period.

In some embodiments, the user may send a modification instruction of product manufacturing parameter according to the production need, the user platform may receive the modification instruction, modify product manufacturing parameters of a production line, generate a first instruction, and send the first instruction to the service platform. Production needs may be determined according to the main production plan. The main production plan refers to all kinds of products and spare parts produced within a planned period of time.

The service platform may receive and process the first instruction, generate a second instruction recognized by the management platform and send it to the general platform of the management platform.

The general platform of the management platform may receive the second instruction and send the second instruction to a plurality of sub platforms of the management platform at the same time. A plurality of sub platforms of the management platform may perform the data processing on the second instruction to generate the third instruction that may be recognized by the sensor network platform, and the third instruction is transmitted to the general platform of the sensor network platform through the sub platforms of the management platform.

A plurality of sub platforms of the management platform may be configured as a stamping management platform, a welding management platform, a coating management platform and a general assembly management platform. The material loss of a single vehicle, a production capacity per unit time, and a safety stock of each material in each automobile production process may be predicted respectively by the plurality of sub-platforms of the management platform. A plurality of sub platforms of the management platform may take the production capacity per unit time, material loss of a single vehicle, safety stock of each material, master production plan, and actual stock in each automobile production process as the basic data of the material requirement planning system to determine the production plan and purchase plan. A plurality of sub platforms of the management platform may generate the third instruction recognized by the sensor network platform based on the production plan and purchase plan.

A plurality of sub platforms of the management platform may send material purchase reminders according to the relationship between actual stock and safety stock in the future. A plurality of sub platforms of the management platform may generate the third instruction recognized by the sensor network platform based on the material purchase reminders.

The general platform of the sensor network platform may receive the third instruction and send the third instruction to a plurality of sub platforms of the sensor network platform at the same time.

A plurality of sub platforms of the sensor network platform may integrate the third instruction with data of the real-time product manufacturing capacity to form different types of configuration files, and send the configuration files to the corresponding object platform. The sub platforms of the sensor network platform are provided with independent sub platform database, and the data of real-time product manufacturing capacity is the real-time data stored in a corresponding sub platform database corresponding to the object platform, which is obtained by a product meter.

The object platform receives the configuration file sent by the sub platform corresponding to the sensor network platform and performs manufacturing and/or sends a purchase reminder according to the configuration file. The object platform may be configured as stamping machine tool and robot, automatic welding equipment and robot, heavy industry spraying robot, general assembly equipment, terminal equipment and acquisition equipment to provide required data for a plurality of sub platforms of the management platform.

FIG. 3 is an exemplary flowchart of a plurality of sub platforms of the management platform performing data processing on the second instruction to generate a third instruction recognized by the sensor network platform according to some embodiments of the present disclosure. As shown in FIG. 3, the process 300 includes the following steps. In some embodiments, the process 300 may be executed by a processor.

In step 310, the plurality of sub platforms of the management platform are configured as a stamping management platform, a welding management platform, a coating management platform, and a general assembly management platform based on stamping process, welding process, coating process, and general assembly process in an automobile production process.

In some embodiments, taking the automobile production process as an example, the automobile production process may include stamping process, welding process, coating process and general assembly process. Accordingly, a plurality of sub platforms of the management platform may be configured as the stamping management platform, the welding management platform, the coating management platform, and the general assembly management platform. The object platform may be configured as stamping machine tool and robot, automatic welding equipment and robot, heavy industry spraying robot, final assembly equipment, terminal equipment and acquisition equipment.

In step 320, respectively predicting material loss of a single vehicle, a production capacity per unit time, and a safety stock of each material in each automobile production process by the plurality of sub platforms of the management platform.

Material loss of a single vehicle refers to the materials lost in each automobile production process in the process of producing a single vehicle. For example, the material loss in the stamping process may include metal material loss. Material loss in the welding process may include welding material loss. The material loss in the coating process may include coating loss. The material loss in the general assembly process may include the loss of parts and connectors.

Production capacity per unit time refers to the count of pieces completed in each automobile production process per unit time. For example, the production capacity per unit time of the coating process may be 100 vehicles per day.

The safety stock of materials refers to the material stock that ensures the normal and orderly operation of the whole production line. For example, the safety stock of paint in the coating process may be 2000 L.

In some embodiments, taking the coating process as an example, when the coating process is fully automatic operation of heavy industry spraying robot without manual participation, the coating management platform may determine the coating loss of a single vehicle through the coating loss prediction model based on the product specification, the coating loss per unit area of the coating process, and the situation of the coating equipment. When the coating process is not fully automatic operation of heavy industry spraying robot and requires manual participation, the input of coating loss prediction model may also include a degree of manual proficiency.

Product specification refers to the volume and size of the product. For example, the product specification may refer to a product of the length, width, and height of the product. In some embodiments, product specification may be obtained based on a terminal device in the object platform.

The coating loss per unit area in the coating process refers to the amount of coating lost per unit area of the vehicle. In some embodiments, the coating loss per unit area in the coating process may be obtained based on the heavy industry spraying robot in the object platform. For example, the average value of the paint lost per unit area of the vehicle sprayed by the heavy industry spraying robot in history may be taken as the coating loss per unit area.

The situation of coating equipment refers to the basic situation of the equipment used in the coating process. In some embodiments, the situation of the coating equipment may include equipment attribute information (e.g., equipment model, etc.), equipment working parameters (e.g., shaping air volume, spraying distance, rotating cup speed, spraying flow, etc.), and equipment maintenance and replacement information (e.g., equipment service time, whether the equipment has been repaired). In some embodiments, the situation of the coating equipment may be obtained based on the heavy industry spraying robot in the object platform.

The coating loss prediction model may be a multi classification model. For more information about the coating loss prediction model, please refer to other parts of the present disclosure, e.g., FIG. 4 and its related description.

In some embodiments, when the coating process is fully automatic operation of the heavy industry spraying robot without manual participation, the coating loss of a single vehicle may be obtained based on the collected historical coating loss data of a single vehicle. For example, the average value of the coating loss data of a historical single vehicle may be taken as the coating loss of a single vehicle.

The prediction method of material loss of single vehicle in other automobile production processes is similar to that of coating loss of single vehicle in coating process, which will not be repeated here. The working parameters of the equipment in the stamping process may include the closing height of the press, the height of the stretching pad, the pressure, the angle of the air source, the number of sensors, the stroke, etc. The working parameters of the equipment in the welding process may include preloading time, welding time, welding pressure, welding current, preheating current, preheating time, cooling holding time, rest time, etc. The working parameters of the equipment in the general assembly process may include the working parameters of the general assembly equipment.

In some embodiments, a plurality of sub platforms of the management platform may determine the adjustment value of the production capacity per unit time of each automobile production process through the capacity prediction model based on the labor situation of each automobile production process and the preset production capacity per unit time of each automobile production process. Then, the production capacity per unit time of each automobile production process is determined based on the preset production capacity per unit time of each automobile production process and the adjustment value of the production capacity per unit time of each automobile production process.

In some embodiments, the processor may input the labor situation of each automobile production process and the preset production capacity per unit time of each automobile production process into the capacity prediction model, and then the capacity prediction model outputs the adjustment value of the production capacity per unit time of each automobile production process.

The capacity prediction model may be a deep learning model, such as a deep neural networks (DNN), a recurrent neural network (RNN), a convolutional neural networks (CNN), etc. For more information about the capacity prediction model, please refer to other parts of the present disclosure, e.g., FIG. 5 and its related descriptions.

In some embodiments, a plurality of sub platforms of the management platform may determine whether the adjustment value of the production capacity per unit time of each automobile production process determined by the capacity prediction model is greater than the preset production capacity per unit time of each automobile production process. In response to a determination that the adjustment value of the production capacity per unit time of each automobile production process is greater than the preset production capacity per unit time of each automobile production process, the preset production capacity per unit time of each automobile production process is taken as the general production capacity per unit time of each automobile production process. In response to a determination that the adjustment value of the production capacity per unit time of each automobile production process is less than or equal to the preset production capacity per unit time of each automobile production process, the adjustment value of the production capacity per unit time of each automobile production process determined by the capacity prediction model is taken as the final production capacity per unit time of each automobile production process. For example, the preset production capacity per unit time of a vehicle coating process is 50 vehicles/hour, if the adjustment value of production capacity per unit time of the coating process is greater than 50 vehicles, 50 vehicles/hour may be determined as the production capacity per unit time of the coating process; if the adjustment value of the production capacity per unit time of the coating process is 40 vehicles/hour, which is less than the preset production capacity per unit time of the coating process of 50 vehicles/hour, 40 vehicles/hour may be taken as the production capacity per unit time of the coating process.

In some embodiments, the safety stock of materials may be determined based on the material loss of a single vehicle.

In some embodiments, taking the coating process as an example, the safety stock of the paint may determine the material demand in the production time period from the current time to the future time based on the material loss of a single vehicle, so as to determine the safety stock. For example, the coating loss of a single vehicle is 2 L, the production period from the current time to the future time is 1 day, and the production capacity of the coating process is 1000 vehicles per day. Then the material demand of the production time period from the current time to the future time is 2×1×1000=2000 L, which may be directly used as the safety stock of paint, or may be used as the safety stock of paint after appropriate increase (for example, 2100 L).

In some embodiments, the safety stock of paint may be adjusted based on the confidence determined by the coating loss prediction model. For example, if the confidence is high, the accuracy of determined the coating loss of a single vehicle is high, so the safety stock of paint may be set lower. If the confidence is low, the accuracy of determined the coating loss of a single vehicle is relatively low, so the safety stock of paint may be set higher. For more information about the confidence determined by the coating loss prediction model, please refer to other parts of the present disclosure, e.g., for example, FIG. 4 and its related description.

In step 330, determining a production plan and a purchase plan by taking the material loss of a single vehicle, the production capacity per unit time, and the safety stock of each material in each automobile production process as basic data of a material requirement planning system.

Basic data refers to the data of some basic material. In some embodiments, the basic data may include the production capacity per unit time, the material loss of a single vehicle, and the safety stock of each material in each automobile production process.

In some embodiments, the basic data also includes a master production plan and a current stock. Master production plan refers to all kinds of products and spare parts produced within a planned period of time, which may be obtained by the terminal device in the object platform. Current stock refers to the stock at the current time, which may be obtained by the acquisition equipment in the object platform.

In some embodiments, a plurality of sub platforms of the management platform may take the production capacity per unit time, material loss of a single vehicle, safety stock of each material, master production plan and actual stock in each automobile production process as the basic data of the material requirement planning system to determine the production plan and the purchase plan.

In step 340, generating the third instruction recognized by the sensor network platform based on the production plan and the purchase plan.

In some embodiments, a plurality of sub platforms of the management platform may generate third instructions recognized by the sensor network platform based on production plans and the purchase plans.

In step 350, sending material purchase reminders by a plurality of sub platforms of the management platform according to the relationship between actual stock at a future time and safety stock.

The actual stock at a future time refers to the actual value of the predicted stock at a certain time after the current time. For example, if the current time is Jan. 1, 2030, the actual stock at the future time may be the actual value of the predicted stock on Mar. 1, 2030.

In some embodiments, the actual stock at the future time is a result that the actual stock at the current time minus the material demand in the production time period from the current time to the future time, and adds the planned receipt capacity in the time period. For example, taking the paint stock as an example, if the length of the production time period from the current time to the future time is 1 day, the actual stock of paint at the current time is set as 3000 L, the demand for paint in one day is set as 2000 L, and the planned stored capacity in one day is set as 1000 L, so the actual stock of paint in the future time is 3000−2000+1000=2000 L.

In some embodiments, the material demand in the production time period from the current time to the future time may be determined based on the length of the production time period from the current time to the future time, the production capacity of the whole vehicle per unit time, and the material loss of a single vehicle. In some embodiments, the material demand in the production time period from the current time to the future time is a result that the length of the production time period from the current time to the future time multiples production capacity per unit time of the whole vehicle, and then multiples the material loss of a single vehicle. For example, taking the paint stock as an example, if the length of the production time period from the current time to the future time is 1 day, the production capacity of the whole vehicle in one day is set as 1000 and the coating loss of a single vehicle is set as 2 L, the coating demand in the corresponding production time period from the current time to the future time is 1×1000×2=2000 L.

In some embodiments, the production capacity per unit time of the whole vehicle may be the production capacity per unit time of the last process. For example, if the last process is the general assembly process, the production capacity per unit time of the general assembly process is taken as the production capacity per unit time of the whole vehicle.

In some embodiments, a material purchase reminder may be sent when the actual stock in the future time is less than the safety stock. For example, taking the coating process as an example, if the safety stock of paint is 120 L and the actual stock in the future time is less than 120 L, a material purchase reminder may be sent. In some embodiments, a material purchase reminder may be sent based on the daily material demand and the actual stock in the future time. For example, taking the coating process as an example, the actual stock of paint in the future time is 400 L, while the paint required for daily production is expected to be 100 L. At this time, the actual stock in the future time is greater than the safety stock, but a reminder may be sent as follows: the stock will be consumed within 4 days, please replenish the stock in time.

Step 360: generating a third instruction recognized by the sensor network platform based on the material purchase reminder.

In some embodiments, a plurality of sub platforms of the management platform may generate a third instruction recognized by the sensor network platform based on the material purchase reminder.

The production plan and purchase plan are determined by taking the production capacity per unit time, the material loss of a single vehicle, and the safety stock of each material in each automobile production process respectively predicted by a plurality of sub platforms as the basic data of MRP. It may purchase materials of appropriate quantity and variety, choose the appropriate time to order, maintain the lowest stock level as far as possible, and obtain various materials required for production in time to ensure the timely supply of products required by users.

Figure 4:
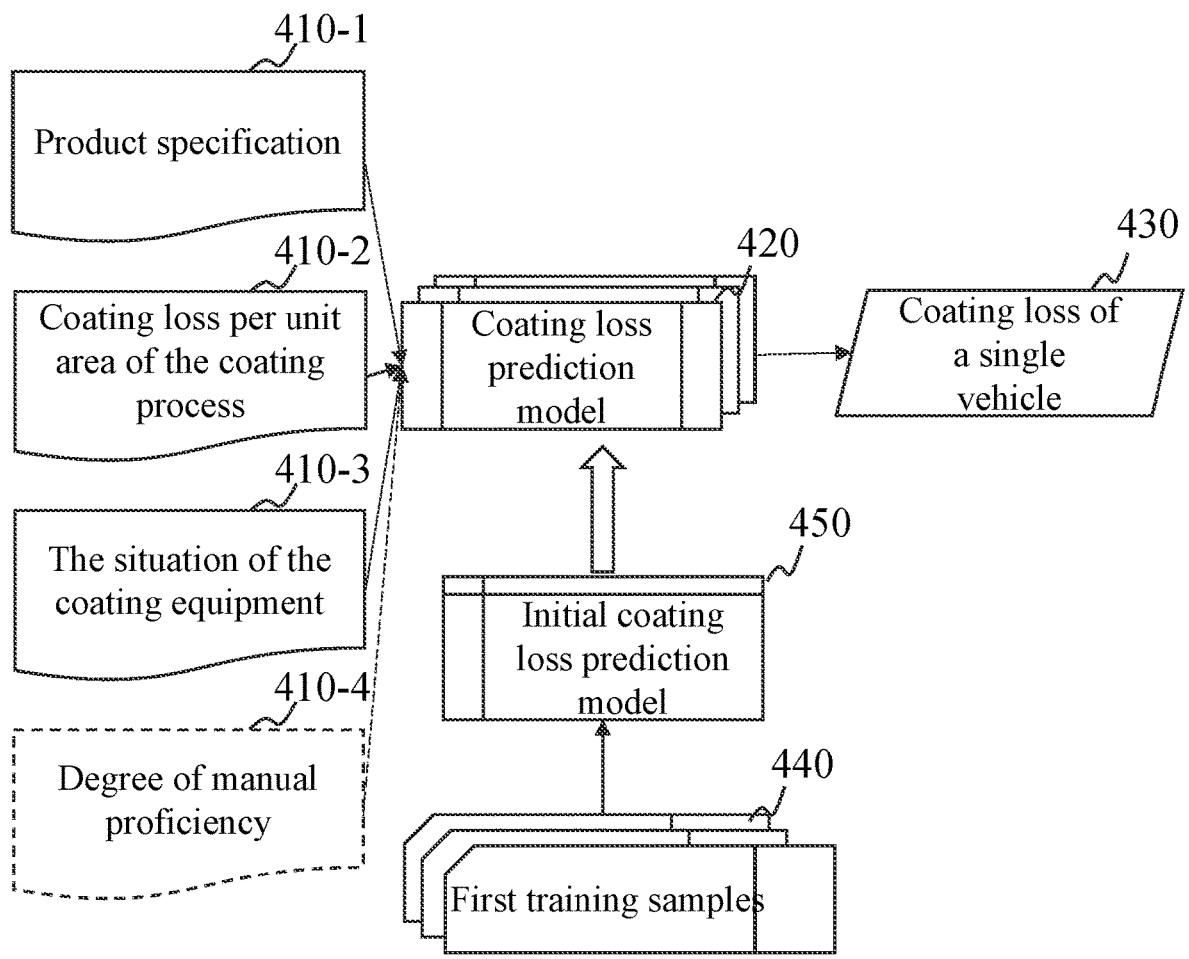
FIG. 4 is a schematic diagram of a structure of a coating loss prediction model according to some embodiments of the present disclosure.

FIG. 4 is a schematic diagram of a structure of a coating loss prediction model according to some embodiments of the present disclosure.

In some embodiments, as shown in FIG. 4, the coating loss prediction model 420 is a multi-classification model, which may include a neural network model (e.g., CNN, RNN, DNN, etc.).

In some embodiments, as shown in FIG. 4, when the coating process is fully automatic operation of the heavy industry spraying robot without manual participation, the input of the coating loss prediction model 420 may include the product specification 410-1, the coating loss per unit area of the coating process 410-2, the situation of the coating equipment 410-3, and the output is the coating loss of a single vehicle 430. When the coating process is not fully automatic operation of heavy industry spraying robot and requires manual participation, the input of coating loss prediction model may also include the degree of manual proficiency 410-4.

The degree of manual proficiency refers to the proficiency of manual operation. In some embodiments, the degree of manual proficiency may be a numerical value or letter that may reflect the manual proficiency. For example, the degree of manual proficiency may be expressed by values between 1-10, letters A-F, or stars. The value is larger, the alphabetical order, or the star is higher, indicating that the degree of manual proficiency is higher.

In some embodiments, the degree of manual proficiency may be determined through the proficiency prediction model based on the number of spraying vehicles per unit time and the qualification rate of spraying vehicles. In some embodiments, the type of proficiency prediction model may include a neural network model (e.g., CNN, RNN, DNN, etc.).

In some embodiments, the proficiency prediction model may be used to process the number of spraying vehicles per unit time and the qualification rate of spraying vehicles to determine the degree of manual proficiency. For example, the number of spraying vehicles per unit time and the qualification rate of spraying vehicles may be input into the proficiency prediction model, and the proficiency prediction model outputs the manual proficiency.

In some embodiments, the proficiency prediction model may be trained and acquired based on historical data. The historical data includes the number of spraying vehicles per unit time of historical workers and the qualification rate of historical spraying vehicles. The number of historical workers' spraying vehicles per unit time and the qualification rate of historical spraying vehicles may be used as training samples. The identification of training samples may be historical degree of manual proficiency. The historical degree of manual proficiency may be determined manually. The training samples with identification may be input into the initial proficiency prediction model, and the parameters of the initial proficiency prediction model may be updated through training. When the training model meets the preset conditions, the training stops and the trained proficiency prediction model is obtained.

In some embodiments, as shown in FIG. 4, the parameters of the coating loss prediction model 420 may be trained by a plurality of groups of labeled first training samples 440. In some embodiments, a plurality of groups of first training samples 440 may be obtained, and each group of first training samples 440 may include a plurality of training data and labels corresponding to the training data. The training data may include the historical product specifications, the coating loss per unit area of the historical coating process, and the situation of the historical coating equipment. The label of the training data may be the actual value of the coating loss of a historical single vehicle.

When the coating loss prediction model 420 is trained, the coating loss of a single vehicle may be divided into several sections (for example, 0 L~20 L, 20 L~40 L, 40 L~60 L, 60 L~80 L, 80 L~100 L), and then the label may be constructed based on the section where the actual value is located. For example, if the actual value of coating loss of a historical single vehicle is 20 L-40 L, the label is [0, 1, 0, 0, 0], that is, the label at the corresponding position of the section is 1 and other positions are 0. Correspondingly, the coating loss of a single vehicle 430 output by the coating loss prediction model 420 is a vector, and the value in the vector represents the possibility of belonging to each section. The section with the largest value in the vector is taken as the prediction result of the model, and the output value of the corresponding section is confidence. For example, the coating loss prediction model 420 may output the probability value of coating loss of five single vehicles, which may be expressed as [0.1, 0.69, 0.05, 0.06, 0.1], and the coating loss 20 L~40 L of a single vehicle corresponding to the highest probability value of 0.69 is the coating loss of a single vehicle. The highest probability value of 0.69 is the confidence of coating loss of a single vehicle.

Through a plurality of groups of first training samples 440, the parameters of the initial coating loss prediction model 450 may be updated to obtain the trained coating loss prediction model 420. In some embodiments, the parameters of the initial coating loss prediction model 450 may be iteratively updated based on a plurality of first training samples so that the loss function of the model meets the preset conditions. For example, the loss function converges, or the loss function value is less than the preset value. When the loss function meets the preset conditions, the model training is completed, and the trained initial coating loss prediction model 450 is obtained. The coating loss prediction model 420 and the trained initial coating loss prediction model 450 have the same model structure.

In some embodiments, when the input of the coating loss prediction model 420 also includes the degree of manual proficiency 410-4, the training sample may also include historical degree of manual proficiency.

Through the coating loss prediction model to predict the coating loss of a single vehicle, the product specification, the coating loss per unit area of the coating process, and the situation of the coating equipment may be taken as the input of the coating loss prediction model, and combined with the interrelated prediction results of manual proficiency, causing that the coating loss prediction model may predict the coating loss of a single vehicle more accurately.

Figure 5:
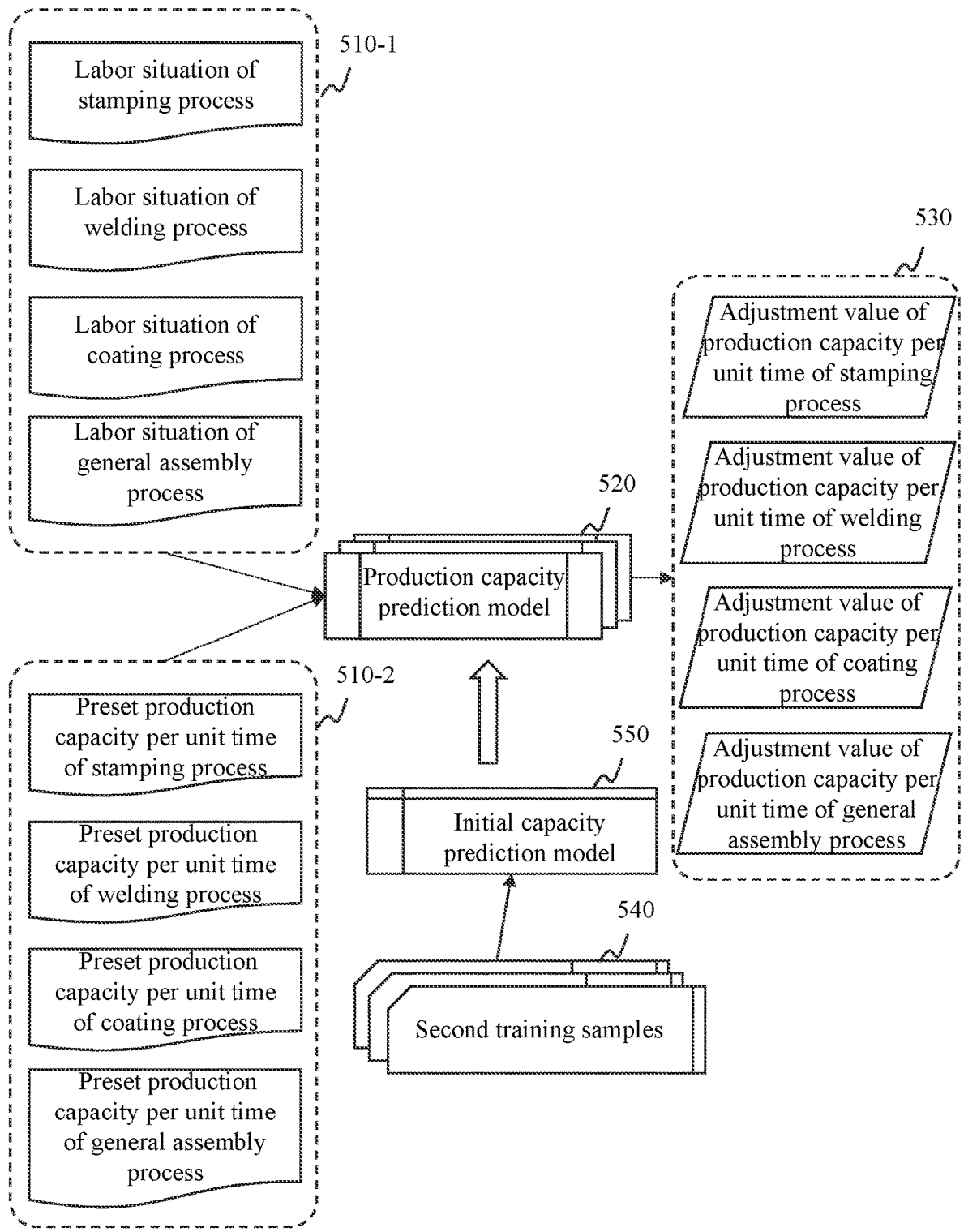
FIG. 5 is a schematic diagram of a structure of a capacity prediction model according to some embodiments of the present disclosure.

FIG. 5 is a schematic diagram of a structure of a capacity prediction model according to some embodiments of the present disclosure.

In some embodiments, as shown in FIG. 5, the input of the capacity prediction model 520 may include the labor situation 510-1 of each automobile production process and the preset production capacity per unit time 510-2 of each automobile production process, and the output is the adjustment value 530 of the production capacity per unit time of each automobile production process.

In some embodiments, the labor situation may include the number of labor and the degree of manual proficiency. For more information about the degree of manual proficiency, please refer to other parts of the present disclosure, e.g., FIG. 4 and its related description.

In some embodiments, as shown in FIG. 5, the parameters of the capacity prediction model 520 may be trained by a plurality of groups of labeled second training samples 540. In some embodiments, a plurality of groups of second training samples 540 may be obtained, and each group of second training samples 540 may include a plurality of training data and labels corresponding to the training data. The training data may include the historical labor situation of each automobile production process and the historical preset production capacity per unit time of each automobile production process. The historical labor situation of each automobile production process and the historical preset production capacity per unit time of each automobile production process are the labor situation and preset production capacity per unit time within the historical time period. The label of training data may be the actual value of historical production capacity per unit time of each automobile production process.

In some embodiments, the parameters of the initial capacity prediction model 550 may be iteratively updated based on a plurality of second training samples to make the loss function of the model meet the preset conditions. For example, the loss function converges, or the loss function value is less than the preset value. When the loss function meets the preset conditions, the model training is completed, and the trained initial capacity prediction model 550 is obtained. The production capacity prediction model 520 and the trained initial capacity prediction model 550 have the same model structure.

Through the capacity prediction model to predict the adjustment value of the production capacity per unit time of each automobile production process, the labor situation of each automobile production process and the preset production capacity per unit time of each automobile production process may be used as the input of the capacity prediction model, so that the capacity prediction model may predict the adjustment value of the production capacity per unit time of each automobile production process more accurately. Then, the production capacity per unit time of each automobile production process is more accurately determined based on the relationship between the preset production capacity per unit time of each automobile production process and the adjustment value of the production capacity per unit time of each automobile production process.

In some embodiments, a computer-readable storage medium may be used to store computer instructions. When the computer instructions are executed by a processor, the control method for the dual front sub platform industrial internet things can be realized.

Those skilled in the art may realize that the units and algorithm steps of each example described in combination with the embodiments disclosed herein can be realized by electronic hardware, computer software or a combination of the two. In order to clearly illustrate the interchangeability of hardware and software, the composition and steps of each example have been generally described according to function in the above description. Whether these functions are performed in hardware or software depends on the specific application and design constraints of the technical scheme. Professional technicians may use different methods to realize the described functions for each specific application, but such realization should not be considered to be beyond the scope of the present invention.

In several embodiments provided in the present application, it should be understood that the disclosed devices and methods may be realized in other ways. For example, the embodiment of device described above is only schematic. For example, the division of the unit is only a logical function division, and there may be another division mode in actual implementation. For example, a plurality of units or components may be combined or integrated into another system, or some features may be ignored or not executed. In addition, the mutual coupling or direct coupling or communication connection shown or discussed may be indirect coupling or communication connection through some interfaces, devices or units, or electrical, mechanical or other forms of connection.

The units described as separate parts may or may not be physically separated. Those skilled in the art can realize that the units and algorithm steps of the examples described in connection with the embodiments disclosed herein can be implemented in electronic hardware, computer software, or a combination of the two. In order to clearly illustrate the interchangeability of hardware and software, the composition and steps of each example have been generally described according to the function in the above description. Whether these functions are performed in hardware or software depends on the specific application and design constraints of the technical scheme. Professional technicians may use different methods to realize the described functions for each specific application, but such realization should not be considered to be beyond the scope of the present invention.

In addition, each functional unit in each embodiment of the present disclosure may be integrated in one processing unit, each unit may exist separately, or two or more units may be integrated in one unit. The above integrated units may be realized in the form of hardware or software functional units.

If the integrated unit is realized in the form of software functional unit and sold or used as an independent product, it may be stored in a computer-readable storage medium. Based on this understanding, the technical solution of the present invention may be embodied in the form of a software product, which is stored in a storage medium, It includes several instructions to enable a computer device (which may be a personal computer, server, grid device, etc.) to perform all or part of the steps of the method described in various embodiments of the present invention. The aforementioned storage media include: USB flash disk, mobile hard disk, read only memory (ROM), random access memory (RAM), magnetic disc or optical disc and other media that may store program codes.

The specific embodiments described above further detail the purpose, technical scheme and beneficial effects of the present disclosure. It should be understood that the above are only the specific embodiments of the present disclosure and are not used to limit the protection scope of the present disclosure. Any modification, equivalent replacement, improvement, etc. made within the spirit and principles of the present disclosure should be included in the protection scope of the present disclosure.

What is claimed is:

1. A system of an industrial internet of things for industrial production control, comprising a user platform, a service platform, a management platform, a sensor network platform, and an object platform that interact in turn, wherein
    the service platform adopts a centralized layout, the management platform and the sensor network platform adopt a front sub platform layout; the centralized layout refers to that the service platform uniformly receives data, uniformly processes the data, and uniformly sends the data; the front sub platform layout refers to that each of the management platform and the sensor network platform is provided with a general platform and a plurality of sub platforms, the plurality of sub platforms respectively store and process data of different types or different receiving objects sent by a lower platform, and the general platform stores, processes, and transmits the data to a upper platform after summarizing the data of the plurality of sub platforms;
    the user platform receives, from a user, a modification instruction of product manufacturing parameters according to production needs, to modify the product manufacturing parameter of a production line, generates a first instruction and sends the first instruction to the service platform, wherein the product manufacturing parameters include a product manufacturing capacity;
    the service platform receives and processes the first instruction to generate a second instruction recognized by the management platform, and sends the second instruction to the general platform of the management platform;
    the general platform of the management platform receives the second instruction and sends the second instruction to the plurality of sub platforms of the management platform at the same time;
    the plurality of sub platforms of the management platform perform data processing on the second instruction to generate a third instruction recognized by the sensor network platform, and the third instruction is transmitted to the general platform of the sensor network platform through the plurality of sub platforms of the management platform, respectively;
    the general platform of the sensor network platform receives the third instruction and sends the third instruction to the plurality of sub platforms of the sensor network platform at the same time;
    the plurality of sub platforms of the sensor network platform integrate the third instruction with data of real-time product manufacturing capacity to form different types of configuration files, and send the configuration files to corresponding object platform, wherein the plurality of sub platforms of the sensor network platform are provided with independent sub platform databases, and the data of real-time product manufacturing capacity is real-time data stored in corresponding sub platform databases corresponding to the object platform, which is obtained by a product meter; and
    the object platform receives the configuration files sent by the corresponding sub platforms of the sensor network platform, performs manufacturing, or sends purchase reminders according to the configuration files.

2. The system of industrial internet of things of claim 1, wherein the plurality of sub platforms of the management platform perform data processing on the second instruction to generate a third instruction recognized by the sensor network platform, including:
    the plurality of sub platforms of the management platform being configured as a stamping management platform, a welding management platform, a coating management platform, and a general assembly management platform based on a stamping process, a welding process, a coating process, and a general assembly process in an automobile production process;
    respectively predicting material loss of a single vehicle, a production capacity per unit time, and a safety stock of each material in each automobile production process by the plurality of sub platforms of the management platform;
    determining a production plan and a purchase plan by taking the material loss of the single vehicle, the production capacity per unit time, and the safety stock of each material in each automobile production process as basic data of a material requirement planning system; and
    generating the third instruction recognized by the sensor network platform based on the production plan and the purchase plan.

3. The system of industrial internet of things of claim 2, wherein the predicting the material loss of the single vehicle in the coating process by the coating management platform includes:
    determining, based on product specification, coating loss per unit area of the coating process, and coating equipment, coating loss of the single vehicle by the coating management platform through a coating loss prediction model.

4. The system of industrial internet of thing of claim 3, wherein the coating loss prediction model is a multi-classification model.

5. The system of industrial internet of things of claim 3, wherein an input of the coating loss prediction model further includes a degree of manual proficiency.

6. The system of industrial internet of things of claim 5, wherein the degree of manual proficiency is determined through a proficiency prediction model based on a count of spraying vehicles per unit time and a qualification rate of spraying vehicles, wherein the proficiency prediction model is a neural network model.

7. The system of industrial internet of things of claim 2, wherein respectively predicting the production capacity per unit time of each automobile production process by the plurality of sub platforms of the management platform includes:
   determining, based on a labor situation of each automobile production process and a preset production capacity per unit time of each automobile production process, an adjustment value of the production capacity per unit time of each automobile production process by the plurality of sub platforms of the management platform through a capacity prediction model, wherein the capacity prediction model is a deep learning model; and
   determining the production capacity per unit time of each automobile production process based on the preset production capacity per unit time of each automobile production process and the adjustment value of the production capacity per unit time of each automobile production process.

8. The system of industrial internet of things of claim 7, wherein the determining the production capacity per unit time of each automobile production process based on the preset production capacity per unit time of each automobile production process and the adjustment value of the production capacity per unit time of each automobile production process further includes:
   determining whether the adjustment value of the production capacity per unit time of each automobile production process determined by the capacity prediction model is greater than the preset production capacity per unit time of each automobile production process;
   in response to a determination that the adjustment value of the production capacity per unit time of each automobile production process is greater than the preset production capacity per unit time of each automobile production process, taking the preset production capacity per unit time of each automobile production process as a final production capacity per unit time of each automobile production process; and
   in response to a determination that the adjustment value of the production capacity per unit time of each automobile production process is less than or equal to the preset production capacity per unit time of each automobile production process, taking the adjustment value of the production capacity per unit time of each automobile production process as the final production capacity per unit time of each automobile production process.

9. The system of industrial internet of things of claim 2, wherein the plurality of sub platforms of the management platform perform data processing on the second instruction to generate the third instruction recognized by the sensor network platform, further including:
   sending a material purchase reminder by the plurality of sub platforms of the management platform according to a relationship between an actual stock at a future time and the safety stock; and
   generating the third instruction recognized by the sensor network platform based on the material purchase reminder.

10. The system of industrial internet of things of claim 9, wherein the actual stock at the future time is determined based on an actual stock at a current time, a material demand in a production time period from the current time to the future time, and a planned receipt capacity in the production time period.

11. A method for industrial production control based on an industrial internet of things, the industrial internet of things including a user platform, a service platform, a management platform, a sensor network platform, and an object platform that interact in turn, wherein
   the service platform adopts a centralized layout, the management platform and the sensor network platform adopt a front sub platform layout; the centralized layout refers to that the service platform uniformly receives data, uniformly processes the data, and uniformly sends the data; the front sub platform layout refers to that each management platform and the sensor network platform is provided with a general platform and a plurality of sub platforms, the plurality of sub platforms respectively store and process data of different types or different receiving objects sent by a lower platform, and the general platform stores, processes, and transmits the data to a upper platform after summarizing the data of the plurality of sub platforms;
   the method comprising:
   sending, by a user, a modification instruction of product manufacturing parameters according to production needs;
   receiving, by the user platform, the modification instruction to modify the product manufacturing parameter of a production line, generating a first instruction and sending the first instruction to the service platform, wherein the product manufacturing parameters include a product manufacturing capacity;
   receiving and processing, by the service platform, the first instruction to generate a second instruction recognized by the management platform, and sending the second instruction to the general platform of the management platform;
   receiving, by the general platform of the management platform, the second instruction and sending the second instruction to the plurality of sub platforms of the management platform at the same time;
   performing, by the plurality of sub platforms of the management platform, data processing on the second instruction to generate a third instruction recognized by the sensor network platform, and transmitting the third instruction to the general platform of the sensor network platform through the plurality of sub platforms of the management platform, respectively;
   receiving, by the general platform of the sensor network platform, the third instruction, and sending the third instruction to the plurality of sub platforms of the sensor network platform at the same time;
   integrating, by the plurality of sub platforms of the sensor network platform, the third instruction with data of real-time product manufacturing capacity to form different types of configuration files, and sending the configuration files to corresponding object platform, wherein the plurality of sub platforms of the sensor network platform are provided with independent sub platform databases, and the data of real-time product manufacturing capacity is real-time data stored in corresponding sub platform databases corresponding to the object platform, which is obtained by a product meter; and receiving, by the object platform, the configuration files sent by the corresponding sub platforms of the sensor network platform, and performing manufacturing, or sending purchase reminders according to the configuration files.

12. The method of claim 11, wherein the performing, by the plurality of sub platforms of the management platform, data processing on the second instruction to generate a third instruction recognized by the sensor network platform includes:

the plurality of sub platforms of the management platform being configured as a stamping management platform, a welding management platform, a coating management platform, and a general assembly management platform based on a stamping process, a welding process, a coating process, and a general assembly process in an automobile production process;

respectively predicting material loss of a single vehicle, a production capacity per unit time, and a safety stock of each material in each automobile production process by the plurality of sub platforms of the management platform;

determining a production plan and a purchase plan by taking the material loss of the single vehicle, the production capacity per unit time, and the safety stock of each material in each automobile production process as basic data of a material requirement planning system; and generating the third instruction recognized by the sensor network platform based on the production plan and the purchase plan.

13. The method of claim 12, wherein the predicting the material loss of the single vehicle in the coating process by the coating management platform includes:

determining, based on product specification, coating loss per unit area of the coating process, and coating equipment, coating loss of the single vehicle by the coating management platform through a coating loss prediction model.

14. The method of claim 13, wherein the coating loss prediction model is a multi-classification model.

15. The method of claim 13, wherein an input of the coating loss prediction model further includes a degree of manual proficiency.

16. The method of claim 15, wherein the degree of manual proficiency is determined through a proficiency prediction model based on a count of spraying vehicles per unit time and a qualification rate of spraying vehicles, wherein the proficiency prediction model is a neural network model.

17. The method of claim 12, wherein the respectively predicting the production capacity per unit time of each automobile production process by the plurality of sub platforms of the management platform includes:

determining, based on a labor situation of each automobile production process and a preset production capacity per unit time of each automobile production process, an adjustment value of the production capacity per unit time of each automobile production process by the plurality of sub platforms of the management platform through a capacity prediction model, wherein the capacity prediction model is a deep learning model; and determining the production capacity per unit time of each automobile production process based on the preset production capacity per unit time of each automobile production process and the adjustment value of the production capacity per unit time of each automobile production process.

18. The method of claim 17, wherein the determining the production capacity per unit time of each automobile production process based on the preset production capacity per unit time of each automobile production process and the adjustment value of the production capacity per unit time of each automobile production process further includes:

determining whether the adjustment value of the production capacity per unit time of each automobile production process determined by the capacity prediction model is greater than the preset production capacity per unit time of each automobile production process;

in response to a determination that the adjustment value of the production capacity per unit time of each automobile production process is greater than the preset production capacity per unit time of each automobile production process, taking the preset production capacity per unit time of each automobile production process as a final production capacity per unit time of each automobile production process; and in response to a determination that the adjustment value of the production capacity per unit time of each automobile production process is less than or equal to the preset production capacity per unit time of each automobile production process, taking the adjustment value of the production capacity per unit time of each automobile production process as the final production capacity per unit time of each automobile production process.

19. The method of claim 12, wherein performing, by the plurality of sub platforms of the management platform, data processing on the second instruction to generate the third instruction recognized by the sensor network platform further includes:

sending a material purchase reminder by the plurality of sub platforms of the management platform according to a relationship between an actual stock at a future time and the safety stock; and generating the third instruction recognized by the sensor network platform based on the material purchase reminder.

20. The method of claim 19, wherein the determining the actual stock at the future time is determined based on an actual stock at a current time, a material demand in a production time period from the current time to the future time, and a planned receipt capacity in the production time period.

* * * * *